3,111,922
Patented Nov. 26, 1963

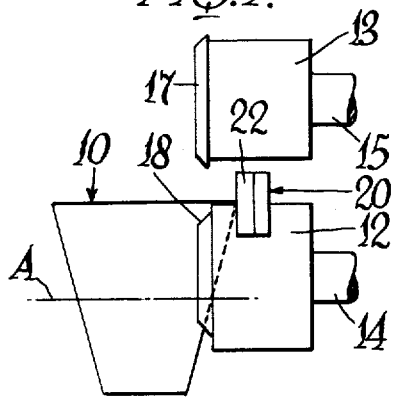
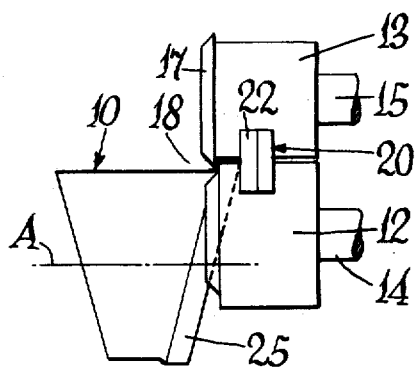
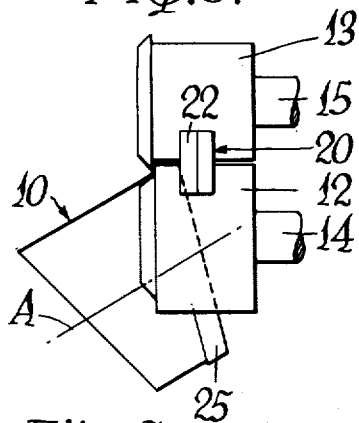
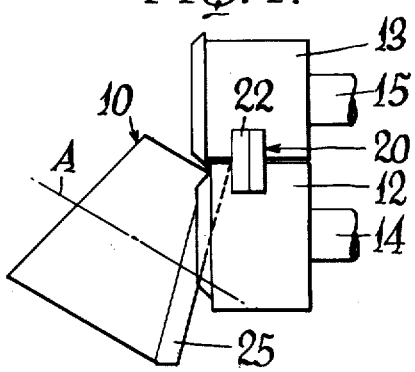
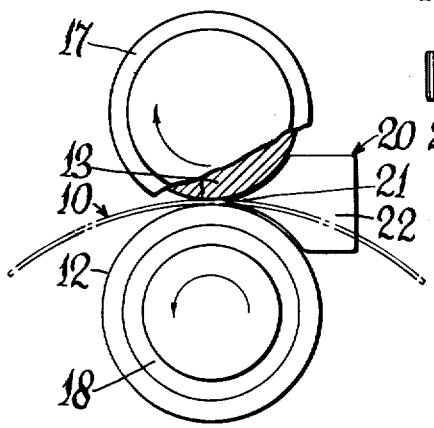
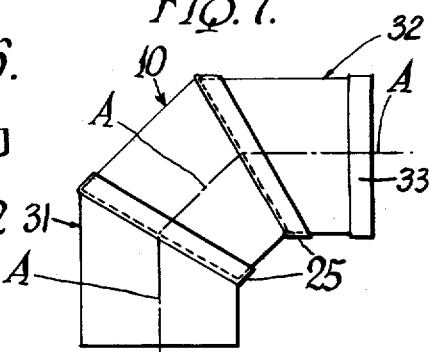
INVENTOR.
Lawrence L. Hock, _United States Patent Office_

3,111,922
METHOD OF MAKING SHEET METAL ELBOWS
Lawrence L. Hock, Snyder, N.Y., assignor to Niagara Machine & Tool Works, Buffalo, N.Y.
Original application Nov. 13, 1956, Ser. No. 621,826. Divided and this application Feb. 16, 1960, Ser. No. 9,141
4 Claims. (Cl. 113—116)

This invention relates to sheet metal elbows of the type used in heating conduits and other conduit and duct work and the like and to a method for producing such elbows. This application is a division of my copending application, Serial No. 621,826 filed November 13, 1956 now abandoned.

In the prior art sheet metal pipes or conduits of the type commonly used as furnace pipes or heating or air conditioning conduits or ducts require elbows for angular connections and such elbows often comprise relatively short straight sections with their ends cut off at an angle so that several connected sections will comprise an elbow for connecting a pair of angularly related straight pipe or conduit sections or for connecting other elbows or conduit outlets of various kinds and in various combinations.

Sheet metal conduits or ducts generally, that is without reference to elbow sections, may be joined in end to end telescoping relation in two ways. One common way is to crimp the end of one of the sections to be connected to reduce the diameter of its end portion for fitting into the end of a companion section in telescoping relation. Another way of connecting two such cylindrical ends is to enlarge the diameter of the end portion of one of the conduits so that the end portion of the mating conduit fits within such enlarged portion.

According to the present invention elbow sections are provided which comprise straight cylindrical sections having their ends cut off at an angle so that several such sections connected in end to end relation make up an elbow of the required angle. In the elbow of the present invention one end of each section is diametrally enlarged to provide an annular flange for receiving the plain end of a companion section and such annular flange is deflected with respect to the cylindrical body of which it is a part in such a way that the axis of the annular flange is coincident with the axis of the body portion of the companion part which it receives.

The present invention further provides mechanical means for rolling the end of a sheet metal cylindrical body to produce such an angularly offset enlarged end flange portion and the present invention likewise provides a method of rolling the end of such sheet metal cylindrical body to produce the desired angularly disposed enlarged end portion.

Various objects and advantages of the method and the resultant sheet metal elbow construction will be apparent to those skilled in the sheet metal art from a consideration of the following detailed description and the accompanying drawing wherein a specific apparatus and procedure are set forth. However, it is to be understood that the present invention is not limited to the details thus set forth by way of example nor otherwise than as defined in the appended claims.

In the drawing:

FIG. 1 is a side elevational view of a pair of turning rolls constructed according to one form of the present invention with the rolls spaced apart prior to the initiation of the rolling operation and with an unrolled cylindrical elbow section in position thereon;

FIG. 2 is a view similar to FIG. 1 but with rolls closed or brought together and with an enlarged end flange formed and the elbow section;

FIG. 3 is a view similar to FIGS. 1 and 2 but showing the beginning of a flange deflecting step in the method of the present invention;

FIG. 4 is a view similar to FIG. 3 but showing the final portion of the flange deflecting portion of the method of the present invention;

FIG. 5 is a front end elevational view of the turning rolls of FIGS. 1 through 4 with a portion of the upper roll broken away for clearer illustration;

FIG. 6 is a top plan view of the gauge member of FIGS. 1 through 5; and

FIG. 7 is an elevational view of a three-section elbow constructed in accordance with one form of the present invention.

Like characters of reference denote like parts throughout the several figures of the drawing. In FIG. 1 the numeral 10 designates a short cylindrical section of sheet metal pipe or conduit having its ends formed at an oblique angle with respect to the axis of the cylinder, such axis being indicated at A in FIG. 1. When two such cylindrical sections with obliquely formed ends are placed end to end the axis of one will deviate from the axis of the other at an angle which is equal to the sum of the angles which each of the meeting ends makes with a line at right angles to the axis of the cylindrical section of which it forms a part. This general method of producing elbows by connecting several short straight cylindrical sections in angular relation is understood by those skilled in the sheet metal art.

In FIG. 1 the cylindrical section 10 is shown in starting position with respect to a pair of forming rolls 12 and 13 which are carried by shafts designated 14 and 15, respectively. Shafts 14 and 15 mount the rolls 12 and 13 for selective movement toward and away from each other (by downward and upward movement of roll 13) and for joint rotation, either by a hand crank or by power means, in a manner which is well understood in the sheet metal roll former art.

The rolls 12 and 13 comprise main cylindrical body portions and outer end portions which are of novel construction as far as present purposes are concerned. This outer end construction of the rolls 12 and 13 will now be described. Roll 13 is provided with an enlarged outer end portion 17 whose inner surface is radial, that is, at right angles to the periphery of the body of roll 13. The periphery of end portion 17 is beveled as shown to cooperate with the aforesaid inner radial surface in providing a V-shaped rolling edge for a purpose and in a manner which will presently appear. The mating roll 12 likewise has a main cylindrical body portion and is further provided with a reduced outer end projection portion 18 which is frusto-conical in form whereby its periphery is likewise beveled or tapered for a purpose which will presently appear.

The numeral 20 designates a gauge block which is attached to the framework of the machine in any convenient manner so that it occupies the position illustrated in FIG. 5 when the rolls 12 and 13 have been brought fully together in a rolling operation. The gauge block is arcuately pointed as shown at 21 in FIG. 5 to extend between the rolls 12 and 13 for gauging purposes and is provided with a forward arcuate surface 22 as appears more clearly in FIG. 6. As viewed in plan in FIG. 6, the arcuate face 22 of gauge block 20 has its radius of curvature struck from the axes of rolls 12 and 13, which axes are coincident as viewed in plan.

Beginning with the blank cylindrical section 10 in the position shown in FIG. 1, the roll 13 is gradually lowered as the rolls 12 and 13 are rotated to thereby rotate and form the engaged end of cylindrical section 10 to form an enlargement at such engaged end as indicated at 25 in FIG. 2. At this point in the operation the enlargement is fully formed as to depth but is still concentric with the main axis A of the cylindrical section.

During the final passes of this forming operation the apex of the V-shaped enlarged end portion 17 of roll 13 cooperates with the reentrant angle formed by the beveled face of projection 18 of roll 12 and the radial end face of the main body of roll 12 to form the angle occurring where the enlargement 25 meets the cylindrical surface of the main body 10.

The workman then deflects the main body section 10 as shown in FIG. 3, the section 10 being then in a position where the peripheral portion which is of longest axial dimension is engaged between rolls 12 and 13. The portion of the annular flange which forms enlargement 25 which is then engaged between rolls 12 and 13 is bent so that the angle it makes with the main peripheral portion of section 10 is the same as the angle which the interfitting companion section is to make with the instant section.

Rotation of the rolls and the section 10 is then continued so that the flange forming enlargement 25 is deflected in a like manner whereby the entire enlargement 25 comprises a short oblique cylindrical section having its axis at an angle to the axis of the main section 10 for receiving the end of an obliquely disposed companion section.

When this rolling and deflection is complete, which may be effected in one or more rotations of the section 10, the flange of enlargement 25 at the short side of cylindrical section 10 will be deflected as indicated in FIG. 4, at which point in the operation the roll 13 will be raised to permit removal of the completed cylindrical section 10. The flange bending described in connection with FIGS. 3 and 4 is made possible by the beveled nature of the portions 17 and 18 of rolls 13 and 12, respectively, which bevels form a V-shaped clearance gap to permit free angular movement of the main body section 10.

The section 10 thus described is then assembled with companion sections 31 and 32, as shown in FIG. 7 to form a complete elbow. It will be noted that the center section 10 and the right-hand section 32 in FIG. 7 each have a plain but obliquely disposed end which telescopes within the enlarged end 25 of the adjacent companion section. In each case such enlarged end 25 comprises a cylindrical formation having an axis coincident with the main axis of the section which fits thereinto.

The outer enlarged end of the right-hand section 32 is designated 33 and in the present instance, is coaxial and undeflected and extends at right angles to the axis A of section 32, so as to receive the end of a straight pipe section. The lower end of the lower left-hand section 31 is cut off at right angles to the axis thereof to fit within a coaxial enlargement of a straight pipe section. This coaxial enlargement of the straight pipe section will be identical in form to the enlargement 33 of the section 32.

It will be noted by referring to FIG. 7, that the composite 90° elbow provided in the specific embodiment set forth herein by way of example comprises two 45° elbows. That is, the joint between the section 10 and the section 31 forms a 45° elbow and the joint between the section 10 and the section 42 forms a second 45° elbow. It will further be noted that this is accomplished in the illustrated instance by forming each of the several companion ends of the sections at an angle of 22½° to a plane perpendicular to the principal axis of such section.

I claim:
1. The method of forming sheet metal elbows comprising cylindrical metal conduit members having angular telescoping connection with companion cylindrical members which comprises forming a hollow cylindrical metal conduit with an end face thereof disposed at an oblique angle to its axis, forming a coaxial oblique cylindrical enlargement at said end, then deflecting the annular wall of said cylindrical enlargement so that the axis thereof extends at such an angle that the plane of the aforesaid oblique angle substantially bisects the angle between the axis of the cylindrical member and the deflected axis of said cylindrical enlargement, forming a second hollow cylindrical metal conduit of substantially the same diameter as the first conduit with an end face at the same angle as the aforesaid end face of the first conduit, and interfitting said end face of said second conduit in said enlargement whereby said second conduit extends coaxially with said deflected cylindrical enlargement.

2. The method of forming cylindrical metal conduit members for angular telescoping connection with companion cylindrical members which comprises forming a hollow cylindrical metal conduit with an end face thereof disposed at an oblique angle to its axis, forming a coaxial oblique cylindrical enlargement at said end, then deflecting the annular wall of said cylindrical enlargement so that the axis thereof extends at such an angle that the plane of the aforesaid oblique angle substantially bisects the angle between the axis of the cylindrical member and the deflected axis of said cylindrical enlargement.

3. The method of forming cylindrical sheet metal conduit members for angular telescoping connection with companion cylindrical members which comprises forming a conduit member with an end face thereof disposed at an oblique angle to its axis, forming a cylindrical enlargement at said end, then deflecting the annular wall of said cylindrical enlargement so that the axis thereof extends at such an angle that the aforesaid oblique angle substantially bisects the angle between the axis of the cylindrical member and the deflected axis of said cylindrical enlargement.

4. The method of forming a pair of hollow cylindrical sheet metal conduit members for angular telescoping connection to form a 45° elbow joint which comprises forming one of said members with an end face thereof disposed at an angle of approximately 22½° to a plane perpendicular to its axis, forming a coaxial oblique cylindrical enlargement at said end, then deflecting the annular wall of said cylindrical enlargement so that the axis thereof extends at an angle of approximately 135° to the main axis of said member, and forming the companion end face of the other member at an angle of approximately 22½° to fit within said deflected cylindrical enlargement.

References Cited in the file of this patent
UNITED STATES PATENTS

| 287,494 | Barker | Oct. 30, 1883 |
| 1,469,489 | Vasselli | Oct. 2, 1923 |
| 2,482,558 | Scaringella | Sept. 20, 1949 |

FOREIGN PATENTS

| 432,524 | France | Oct. 6, 1911 |